United States Patent [19]

Schwarz

[11] Patent Number: 4,464,579

[45] Date of Patent: Aug. 7, 1984

[54] DERRIEUS WIND TURBINE ELECTRIC GENERATING SYSTEM

[75] Inventor: Edward L. Schwarz, Minneapolis, Minn.

[73] Assignee: Control Data Corporation, Minneapolis, Minn.

[21] Appl. No.: 389,524

[22] Filed: Jun. 17, 1982

[51] Int. Cl.³ ............................ F03D 7/06; H02P 9/06
[52] U.S. Cl. ........................................ 290/44; 290/55; 322/35
[58] Field of Search ...................... 290/44, 55; 322/35

[56] References Cited

U.S. PATENT DOCUMENTS 4,112,311 9/1978 Theyse .................................. 290/55

OTHER PUBLICATIONS

Engineering News: Computerized Windmill Delivers 200 KW to Utility Grid/Design News, 5/7/79, pp. 8-10.

Primary Examiner—G. Z. Rubinson
Assistant Examiner—Shelley Wade
Attorney, Agent, or Firm—Edward L. Schwarz; J. A. Genovese

[57] ABSTRACT

A wind electric system intended to provide power to a power grid, for use with a wind turbine which has no starting torque. The generator is one which can function as a motor as well. When the wind is too light to permit generation, an overriding clutch mechanically disconnects the generator shaft from the turbine shaft. The clutch has also the capability of locking the generator shaft to the turbine shaft in response to a control signal. When wind speed is great enough to permit generation and the turbine is stopped, a control signal is issued locking the generator shaft to the turbine shaft. Power from the power grid causes the generator to function as a motor and accelerate the turbine to permit it to be rotated by the wind. The clutch is then returned to overriding operation and electrical generation continues until wind speed again becomes too light.

4 Claims, 2 Drawing Figures

DERRIEUS WIND TURBINE ELECTRIC GENERATING SYSTEM

BACKGROUND OF THE INVENTION

With increasing cost of fossil fuel energy, alternate emergy sources have become economically feasible. Among these sources is wind power. Wind power has always suffered from its unpredictability from day to day and season to season. The creation over the last few decades of the national electric power grid and large centralized fossil fuel-powered generators, however, has to some extent alleviated this problem. Conventional fossil (and nuclear) electric generation can provide power in individual locations when wind velocity is not high enough to permit self-sustaining operation. The electric power grid provides a means for transmitting an excess of wind power in a local area to users in remote areas.

Among the types of wind turbines employed as prime movers in wind generation systems is the so-called Darrieus or "egg beater" turbine. These turbines are formed of thin flexible ribbons attached at their ends to a central rotating shaft and have an aerodynamic cross-section. Wind blowing across the ribbons generates lift on them. Centripetal force maintains the ribbons in a taut catenary curve when the shaft is rotating, so the tangential stiffness thereby created transforms the lift into torque on the shaft. The advantages of the Darrieus turbine are the extreme simplicity and low cost, omnidirectionality respecting wind, and the vertical axis of rotation precluding the necessity for a gear box or a generator mounted aloft adjacent to the turbine. The great disadvantage inherent with Darrieus turbines is the fact that they have no starting torque. When not rotating, the wind blowing across the ribbons cannot act on their profiles to create lift on them.

In copending application Ser. No. 06/389523, having a common filing data with this application, Gale Jallen as applicant, and entitled "Wind Driven Induction Generator," an induction generator driven by a wind turbine and connected to it by an overriding clutch is disclosed. The use of the overriding clutch prevents the generator from using electric power from the grid as a motor to turn the turbine when wind speed is not itself sufficient to rotate the turbine at a speed causing negative slip and thus inducing electric generation by the generator.

A wind electric system employing a Darrieus turbine forms the subject of U.S. Pat. No. 4,112,311. *Aviation Week and Space Technology*, July 14, 1980, at page 81 and especially at page 89 discusses the Darrieus turbine. U.S. Pat. No. 3,596,105 teaches the use of a motor/generator for a starter for jet engines, and after starting for a generator for engine and airplane accessories.

BRIEF DESCRIPTION OF THE INVENTION

I propose to combine both the advantages of the Darrieus wind turbine and of Jallen's invention identified above, in a single system. The generator, or better generator/motor, is intended to be connected to the power grid. When the Darrieus turbine is still, and wind speed is sufficient to permit generation, the generator/motor is caused to operate as a motor and locked to the turbine shaft to provide start-up torque for the turbine. This is accomplished by a two-way clutch which operates in an overriding mode during normal generation, and in a lock up mode during turbine starting. The clutch status is regulated by a clutch control signal.

A control means senses the turbine shaft rotation and the wind speed, and when wind speed is sufficient to permit generation, but the turbine shaft is not rotating, then logic elements supply a control signal to the clutch causing it to lock up and transmit torque from the motor to the turbine until the wind turbine generates torque by the wind blowing through it.

According, one advantage of this invention is to provide start up torque conveniently and inexpensively for a Darrieus turbine prime mover in a wind electric system.

A second purpose is to prevent waste of energy by the generator/motor operating as a motor during times when the wind is too light to rotate the turbine at power-producing speeds.

Another purpose is to reduce the complexity of a wind generation system.

DESCRIPTION OF THE PREFERRED EMBODIMENTS

Figure 1:
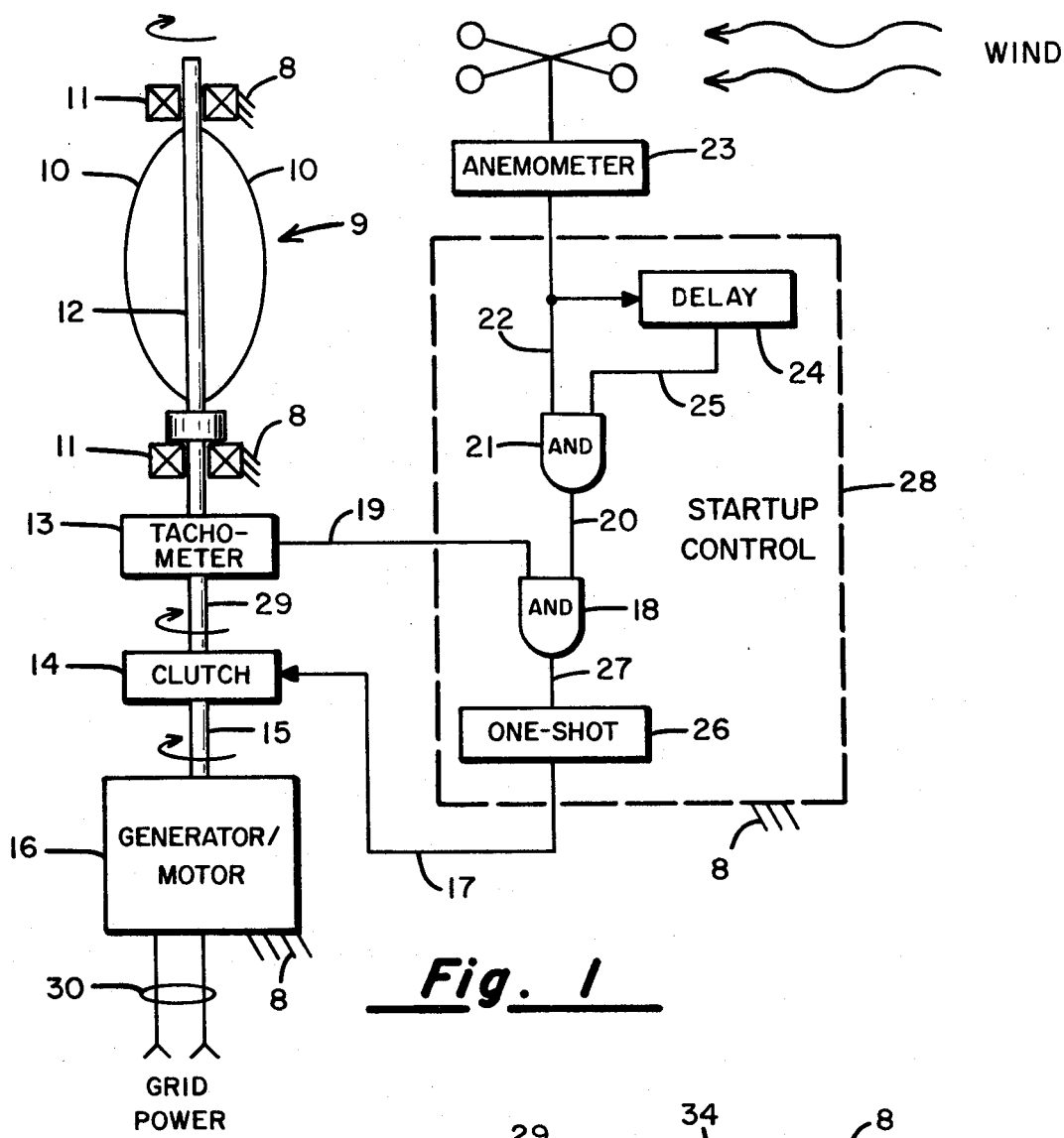
FIG. 1 is a combined block and logic diagram of the invention's preferred embodiment.

FIG. 1 discloses a Darrieus type wind turbine 9 having a central shaft 12 mounted for rotation in bearings 11, said bearings carried on a frame or support 8 shown schematically only. The blades 10 comprise thin ribbons of flexible material such as plastic or fiberglass having an aerodynamic teardrop shaped cross-section which provides lift when air flows across it. This lift causes blades 10 to apply torque to shaft 12, the distended shape of blades 10 resulting from centripetal force causing them to become quite rigid in the tangential (with respect to their movement around shaft 12) direction.

This torque is transferred to clutch 14 through shaft 29. A conventional step-up gearbox may be present between turbine shaft 12 and shaft 29 to provide a more suitable input speed to generator 16. Tachometer 13 is operatively located adjacent clutch input shaft 29 to measure the shaft's rotational speed, and indicates by means of its electrical output signal on path 19 the operating conditions of turbine 9. Tachometer 13 need not indicate, for purposes of implementing this invention, the precise speed at which turbine 9 is running. Rather, tachometer 13 simply indicates by means of its output signal the turbine operating condition, that is whether the turbine is or is not rotating at a speed sufficient to allow acceleration to operating speed given sufficient wind speed. For convenience, the signal produced by tachometer 13 on path 19 has a second logic level when the turbine is stopped or its speed is below that which allows the wind to accelerate it to its energy producing level when lightly loaded. If turbine 9 has a rotational speed sufficient to permit its acceleration to operating levels, then signal path 19 has a first logic level output. It is convenient to interpret the first logic level as a Boolean or logical 0 and the second logic level as a Boolean or logical 1; this convention will be followed throughout this description for the various elements receiving and producing logic signals.

Figure 2:
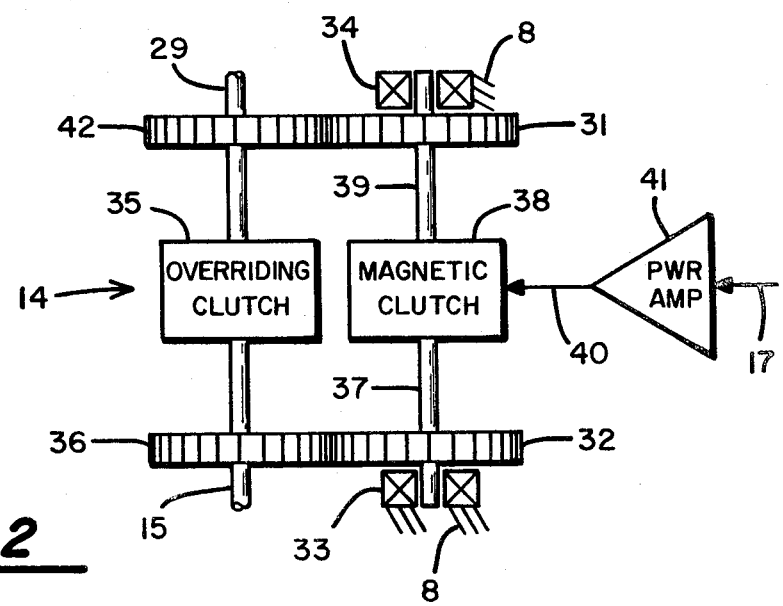
FIG. 2 is a diagram of a preferred clutch assembly.

Clutch input shaft 29 is rotated by turbine shaft 12. Output shaft 15 of clutch 14 forms the input shaft of generator/motor 16. The override mode of operation for clutch 13 permits the transfer of torque from input shaft 29 to output shaft 15, and prevents the transfer of torque from output shaft 15 to input shaft 29. Clutch 14 operates in override mode responsive to the first logic level (logical 0) of a clutch control signal on signal path 17. Clutch 14 has a lockup mode as well, in which the input shaft 29 and output shaft 15 are locked together, turning as a single unit. Clutch 14 operates in its lockup mode responsive to a second logic level (logical 1) of the clutch control signal on path 17. A suitable design for such a clutch is shown in FIG. 2.

Anemometer 23 is mounted adjacent turbine 9, and measures speed of the wind impinging on turbine 9. Anemometer 23 supplies a wind strength signal on path 22 which for convenience, has the first logic level (logical 0) to indicate that wind strength is below a threshold level necessary to produce useful electric power for the particular generator system, and the second logic level (logical 1) to indicate the wind speed is at or above the threshold permitting electric generation.

The output of anemometer 23 is applied to delay 24 and one input of AND gate 21. Delay 24 output on path 25 follows the signals on path 22 with a predetermined time delay and is applied to another input of AND gate 21. AND gate 21 electronically duplicates the Boolean AND function. Accordingly when the signals on both paths 21 and 25 are logical 1's, the output signal on path 20 is also a logical 1, and at all other times is a logical 0. One input of AND gate 18 receives the output of AND gate 21 on path 20. The second input of AND gate 18 is supplied by tachometer 13. The output of AND gate 18 on path 27 is applied to the input of one-shot 26. One-shot 26 produces a second logic level (logical 1) on its output path 17 for a predetermined set time interval responsive to receiving a change from logical 0 to logical 1 on path 27. The output of one-shot 26 on path 17 forms the clutch control signal. A logical 0 on path 17 corresponds to the first level of the clutch control signal, which specifies the overriding mode of operation for clutch 14. A logical 1 on path 17 corresponds to the second level of the clutch control signal on path 17, which causes clutch 14 to operate in lockup mode. Power to operate all these elements can easily be provided by a power supply drawing power from the power grid.

Generator/motor 16 is preferably a squirrel cage induction motor operating with equal facility as a generator, see the Jallen application identified earlier. As in the Jallen application, power flows back and forth between the power grid and generator/motor 16 on conductors 30. Generator/motor 16 is carried on support 8, only shown schematically as mentioned earlier.

The simple plan I employ here for deciding when to attempt to start up this generating system depends on the assumption that if two wind measurement samples spaced a selected time interval (delay 24 time) apart both show wind speed at some threshold level where worthwhile generation can occur then it pays to attempt start-up. The interval and wind speed threshold must be tailored for the average wind conditions for the specific geographic location and for the generator and turbine characteristics. It is possible if the spacing is too short, the same lonely gust of wind on an otherwise still day might cause a start-up attempt. Similarly, a too long spacing might result in start-up too late to efficiently use wind regimes occurring after a quiet spell. Thus, it seems that a time spacing of perhaps 30 seconds to 3 minutes is most suitable. Lastly, it is certain that two spaced samples, as proposed here will occasionally coincide with two short gusts on an otherwise still day, and result in a start-up attempt which fails.

There are several answers to concerns such as these. The expense of wind generator devices will typically dictate their installation only in locations where ambient wind is relatively high. Thus, the incidence of failed start-ups will probably be quite small. Secondly, experience and the continually declining cost of electronic microprocessing systems will undoubtedly result in improved start-up procedures. This will be discussed in more detail later. And lastly, a failed start-up is not a disaster by any stretch of the imagination. It costs no more than the value of the electricity generated in a few seconds or minutes by the system during operation in modest winds.

In operation, assume first that wind speed has been for some time below that suitable for generation so that turbine 9 is stopped. In this case, anemometer 23 produces a first logic level, i.e., a logical 0 on path 22. Tachometer 13 produces a second logic level or logical 1 on path 19 since shaft speed of turbine 9 is obviously below that necessary to permit the wind to accelerate it to operational speed given enough wind to sustain such rotation. Let us now assume wind speed increases to a constant level sufficient to permit generation and above the threshold level. Anemometer 23 output on path 22 changes from a logical 0 to a logical 1. The logical 1 signal on path 22 is delayed by delay 24 for its specified time constant and emerges on path 25. As explained in the preceding discussion, the amount of delay is dependent on the time appropriate between threshold wind speed samples before attempting to start turbine 9.

If wind speed is still above the threshold wind speed permitting generation of electricity after the delay time of delay 24 has elapsed, then logical 1 signals will be present on both path 22 and 25, causing AND gate 21 to produce a logical 1 on signal path 20. Since in these initial conditions turbine 9 is not rotating, a logical 1 is present on path 19 from tachometer 13 as well, causing AND gate 18 to produce a logical 1 on path 27 setting one-shot 26 and causing clutch 14 to enter its lockup mode. (It is assumed that generator/motor 16 is always connected to grid power, even when wind speed is below that sustaining generation. Clutch 14, while in its overriding mode prevents generator/motor 16 from using more than a nominal amount of power, see Jallen case identified above.) Generator/motor 16 output torque is thus applied for as long as one-shot 26 is set through clutch 14 from shaft 15 to turbine shaft 12 and turbine 9 is accelerated to at least a speed from which the wind can further accelerate it to its electrical power generating speed. The one-shot 26 time is selected to be substantially greater than that necessary to accelerate turbine 9 to the point where the wind can accelerate it further to operating speed. When one-shot 26 clears itself, this causes clutch 14 operating mode to change from lockup to override. Generator/motor 16 then may reaccelerate to its idle speed, depending on the speed at which turbine 9 accelerates. When turbine 9 has accelerated sufficiently to begin applying torque to shaft 15 through clutch 14, then generator/motor 16 is driven by turbine 9 into negative slip, causing power to flow to the grid on conductors 30.

At some later time wind speed will again drop below that necessary to generate electricity. If the wind speed is still sufficient to keep turbine 9 rotating within the range which permits turbine 9 to accelerate to power generating level with increased wind speed, then clutch 14, in its overriding mode, automatically disconnects turbine 9 from generator/motor 16 and both turbine 9 and generator/motor 16 idle at their respective speeds. An increase in wind speed to generating velocity then causes turbine 9 to reaccelerate and provide input torque to generator/motor 16, reestablishing flow of power into the power grid on conductors 30. No start-up attempt occurs because tachometer 13 output is a logical 0.

If the wind dies away so completely that turbine 9 stops or drops below the level from which it can again accelerate to generating speed, then the output of tachometer 13 on signal path 19 changes from a logical 0 to a logical 1, and the system is reset for the next time when wind speed increases to a level permitting power generation.

The compound clutch 14 described earlier can take a variety of forms. One which I suggest is shown in FIG. 2, and employs an overriding clutch 35 of greater capacity, but similar to, those comprising the small centrifugal clutches used in motorized bicycles, or the freewheel ratchet devices used in the derailleur mechanisms of 10-speed bicycles. Shaft 29 carries gear 42 in mesh with gear 31. Overriding clutch 35 has shaft 29 as its torque input and shaft 15 as its torque output. Shaft 15 also carries gear 36 in mesh with gear 32. Shaft 37 carries gear 32, shaft 37 being journaled in bearing 33. Similarly, gear 31 is carried by shaft 39, said shaft being journaled in bearing 34. Bearings 33 and 34 are fixed to the frame 8 supporting the entire generating system. Shafts 37 and 39 form the input and output shafts respectively for magnetic clutch 38. Magnetic clutch 38 is one of the type which allows its shafts to rotate independently of each other when no current is applied on conductor 40, and locks the two shafts to each other when sufficient current is applied on conductor 40. For convenience, the number of teeth in each of the gears 30, 31, 32, and 36 may all be equal to each other.

In operation, a logical 1 on signal path 17 causes power amplifier 41 to produce a current on conductor 40 sufficient to cause clutch 38 to lock shaft 37 to shaft 39. A logical 0 on signal path 17 causes power amplifier 41 to produce effectively no current on the conductor 40. When a logical 0 is present on path 17, and magnetic clutch 38 is not engaged, torque flows from shaft 29 to shaft 15 through over-riding clutch 35 as long as the speed of shaft 29 is not less than the no-load speed of shaft 15, as produced by generator/motor 16. When magnetic clutch 38 is engaged, then generator/motor 16 rotates shaft 15 causing gear 36 to turn gear 32. Gear 32 transmits the torque which it receives from gear 36 through shaft 37, magnetic clutch 38, and shaft 39, to gear 31. Gear 31 transmits this torque to gear 42, causing shaft 29 to rotate in the same direction that shaft 15 is rotating. During operation of the clutch in overriding mode, very little wear on gears 42, 31, 32, and 36 will occur because very little load is placed on them.

A wide variety of implementations are possible for this invention. The aforementioned Jallen invention in particular dovetails neatly with the invention described herein. The generator in my invention may be easily replaced with the multispeed device described by Jallen. In that case the generator most conveniently will operate at the lowest synchronous speed during startup, so that synchronous speed need not be immediately changed once the system starts generating. Control system 28 can easily incorporate the speed changing mechanism required by the Jallen invention.

Another improvement which one may wish to implement is to disconnect generator/motor 16 from the power grid during prolonged periods of no wind. This can be very easily accomplished by using the output of AND gate 21 on path 20 to control a switch interposed between generator/motor 16 and grid power. When a logical 0 is present on path 20, then generator/motor 16 should be disconnected from grid power. Of course power for the logic elements must be available at all times.

Perhaps the area where the greatest variation in design can occur is in the start-up control 28. The rudimentary control shown in FIG. 1 will, as explained above, result in false starts on occasion. False starts can be reduced by increasing the sophistication of start-up control 28. For example, one might wish to sample wind speed at a preselected number of shorter intervals and only if the speed did not drop below the threshold level for any of them, attempt start-up. If start-up fails, one may include a timer to delay start-up for some longer period of time, to prevent frequent failed start-ups in certain weather patterns where wind may come up for brief periods, and then drop.

Probably in larger installations it will be useful to employ a microprocessor to perform the functions of start-up control 28. With a microprocessor and the proper sensors and historical data, control 28 can relatively cheaply take into account time of day, time of year, temperature, sky cover, and short range history in deciding whether start-up is likely to be profitable. These problems are not unique to the particular implementation I have taught herein.

Having thus described my invention, what I wish to protect by letters patent is:

1. In an electric generating system of the type to be connected to a power grid carrying current of preselected frequency and phase, and to supply power to and receive power from the grid, and designed to operate with a wind turbine prime mover having negligible starting torque, the combination of
   (a) a support on which the turbine can be mounted;
   (b) a clutch having an input shaft for connection to the turbine shaft and an output shaft, and having an overriding mode permitting the transfer of torque from the input shaft to the output shaft and preventing the transfer of torque from the output shaft to the input shaft, said clutch entering its overriding mode responsive to a first level of a clutch control signal, said clutch also having a lockup mode wherein torque from the output shaft can be transferred to the input shaft, said clutch entering its lockup mode responsive to a second level of the clutch control signal;
   (c) A generator mounted on the support and whose rotor is connected to rotate with the clutch output shaft, and having output terminals for providing electric power to the grid when torque is applied to the rotor, said generator also functioning as a motor and supplying torque to the clutch output shaft responsive to the combination of absence of torque to the rotor from the clutch output shaft and current input to the generator output terminals;
   (d) an anemometer mounted adjacent the wind turbine support and producing a wind strength signal having a first level indicative of wind below a predetermined threshold speed, and a second level indicative of wind at or above the threshold speed;

(e) turbine operating condition indicating means sensing whether the turbine is rotating, for supplying a turbine speed signal having a first level responsive to the turbine having rotational speed above a predetermined level, and a second level otherwise; and (f) start-up control means receiving the turbine speed signal and the wind strength signals, for supplying a clutch control signal having its second level for at least a predetermined interval responsive to the wind strength signal falling within its second level when the turbine speed signal is at its second level, and supplying a clutch control signal having its first level otherwise.

2. The apparatus of claim 1, wherein the control means includes (a) a timer receiving the wind strength signal and responsive to the wind strength signal's second level generating a restart signal at a preselected interval thereafter; and (b) means receiving the restart signal and responsive to the restart signal coinciding with the wind strength signal's second level setting the clutch control signal to its second level.

3. The apparatus of claim 1, wherein the start-up control means includes means for generating a start-up signal indicative of the wind strength signal falling within its second range for at least portions of a preselected interval length, and a one-shot receiving the start-up signal and the turbine speed signal and having a predetermined set time interval, and responsive to the coincidence of the start-up signal and the second level of the turbine speed signal, supplying a first level clutch control signal for the set time interval of the one-shot.

4. The apparatus of claim 3, wherein the start-up control means further comprises a delay circuit receiving the wind strength signal and supplying said wind strength signal delayed by a predetermined time interval, a first AND gate receiving the wind strength signal and the delayed wind strength signal, and supplying a logical 1 signal responsive to each signal reaching its second level simultaneously, and a logical 0 otherwise, and a second AND gate receiving as inputs the turbine speed signal and the output of the first AND gate, and supplying a start-up signal to the one-shot responsive to coincidence of the second level of the turbine speed signal and a logical 1 from the first AND gate.

* * * * *